(12) United States Patent
McConnell et al.

(10) Patent No.: US 9,975,659 B2
(45) Date of Patent: May 22, 2018

(54) CONNECTABLE CAP

(71) Applicant: 1316 LLC, Las Vegas, NV (US)

(72) Inventors: Thomas E. McConnell, Santa Ynez, CA (US); Qianqian Wang, Jiangsu (CN)

(73) Assignee: 1316 LLC, Las Vegas, NV (US)

( * ) Notice: Subject to any disclaimer, the term of this patent is extended or adjusted under 35 U.S.C. 154(b) by 0 days. days.

(21) Appl. No.: 15/290,421

(22) Filed: Oct. 11, 2016

(65) Prior Publication Data
US 2018/0099781 A1     Apr. 12, 2018

(51) Int. Cl.
*B65D 21/02*     (2006.01)
*B65D 41/02*     (2006.01)
*B65D 81/36*     (2006.01)

(52) U.S. Cl.
CPC ......... *B65D 21/0217* (2013.01); *B65D 41/02* (2013.01); *B65D 81/361* (2013.01)

(58) Field of Classification Search
CPC ... B65D 21/0217; B65D 41/02; B65D 81/361
USPC ........................................................ 215/228
See application file for complete search history.

(56) References Cited

U.S. PATENT DOCUMENTS

| | | | |
|---|---|---|---|
| 3,374,917 A * | 3/1968 | Troy | A63H 33/08 206/504 |
| 3,713,247 A | 1/1973 | Parilla | |
| 4,202,456 A * | 5/1980 | Silber | B65D 81/361 215/228 |
| 5,361,919 A | 11/1994 | Hull et al. | |
| 6,250,986 B1 * | 6/2001 | Sorensen | A63H 33/062 446/121 |
| 6,447,360 B1 * | 9/2002 | Sorensen | A63H 33/062 446/117 |
| 6,702,642 B1 | 3/2004 | Parein | |
| 7,648,407 B1 * | 1/2010 | Sorensen | A63H 33/084 446/120 |
| 8,695,820 B2 | 4/2014 | Rabie | |
| 9,016,473 B2 | 4/2015 | Tamarindo | |
| 2011/0139745 A1 | 6/2011 | Ezra et al. | |
| 2012/0211460 A1 * | 8/2012 | Tamarindo | B65D 41/0485 215/228 |
| 2013/0213927 A1 * | 8/2013 | Hendrickson | B65D 23/00 215/383 |

* cited by examiner

*Primary Examiner* — James N Smalley
(74) *Attorney, Agent, or Firm* — WPAT, P.C., Intellectual Property Attorneys; Anthony King

(57) ABSTRACT

A reusable cap for a container comprising a central body extending along a central axis with a lower end that is open and a top end that is closed by a top plate, wherein the lower end is rotatably engageable with the top end of a similar cap; a skirt that extends around the central axis to surround the central body with an inner edge adjacent to the central body and an opposing outer edge and is radially spaced from the central body by a plurality of tabs to form an open space allowing air passage; a plurality of external cooperating engaging formations on said skirt, wherein the plurality of external cooperating engaging formations comprise at least one male engaging formation and at least one female engaging formation; and wherein the male engaging formation is a protrusion extending radially outward from said skirt and the female engaging formation is defined by an indent.

20 Claims, 12 Drawing Sheets

CONNECTABLE CAP

FIELD OF THE DISCLOSURE

The present disclosure relates to a cap. Specifically, the disclosure relates to a pouch cap which has engaging formations allowing it to be detachably attached to other caps of the same kind.

BACKGROUND OF THE DISCLOSURE

Disposable food containers continue to cause severe environmental and ecological challenges. The recycling of disposable pouch caps is costly and time consuming. Therefore, it would be desirable to provide a liquid container cap of sufficient interest to users, and especially children, to enable reuse of the caps and preclude the need for recycling. Since children are contemplated primary users, it would also be desirable for the cap to comprise an air passage thereby obviating any choking hazards.

U.S. Pat. No. 5,361,919 by Hull discloses a combination bottle cap and construction toy. Hull was concerned with combination bottle cap and toy that were mainly vertically stackable.

U.S. Pat. No. 6,702,642 by Parein discloses a body for use in a toy set. Parein was more specifically concerned with a toy set comprising four bodies provided to be mated adjacent each other and on top of each other.

United States Patent Application Publication number 2011/0139745 by Ezra discloses a body for use in a toy set. The cap comprises a coupling section which frictionally engages with engagement elements from other caps. However, these caps can mainly be coupled vertically.

U.S. Pat. No. 8,695,820 by Rabie discloses a bottle cap with releasable external formations. The cap has engaging formations which allow it to be releasably secured to other caps of the same kind. These caps are engageable only after separation of a ring portion from the sleeve; in addition, the cap does not comprise an air passage making it a choking hazard for children.

U.S. Pat. No. 9,016,473 by Tamarindo discloses a cap for containers. The cap comprises ribs for attaching to a similar laterally adjacent cap and axial teeth for attaching to a similar axially overlapping cap. Tamarindo was mainly concerned with side to side attachments making a plurality of attached cap easily separated. This can lead to structural instability when making figurines using these caps.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The embodiment may seek to satisfy one or more of the above-mentioned desires. Although the present embodiment may obviate one or more of the above-mentioned desires, it should be understood that some aspects of the embodiment might not necessarily obviate them.

Thus, there is still a need for improving pouch caps so as to make them sufficiently interesting to users and enable reuse of the caps and preclude the need for recycling. It is an object of the present disclosure to provide a ready to use pouch closure, for closing a pouch mouth. An additional object is to provide a pouch cap that captures the interest of users sufficiently to discourage them from discarding the pouch cap. Another object of the present disclosure is to provide a pouch cap that can be coupled vertically, horizontally and axially to both identical and differently configured caps. Another object of the present disclosure is to provide a pouch cap adapted to display figurines, balls, and any two dimensional or three dimensional creations. Other objects and advantages of the invention will become apparent from the description provided herein.

BRIEF SUMMARY OF THE DISCLOSURE

Disposable containers for use with food and liquids are prevalent. These disposable containers are commonly referred to as "pouches", which is the term used hereinafter for consistency but without limiting the scope of the disclosure. A pouch as used in the present disclosure may be any food or liquid container.

The present disclosures addresses and overcomes the above described drawbacks of conventional pouch caps by providing a captivating pouch cap that catches the attention of a user which can be used as a toy. By assembling a plurality of pouch caps, the assembly can be in the form of a two or three dimensional figurine, a picture, a ball and/or a game. Users will be encouraged to reuse the bottle or pouch cap rather than discarding them after use.

The pouch cap comprises a central body extending along a central axis with a lower end that is open and a top end that is closed by a top plate, where the lower end is rotatably engageable with the top end of a similar cap, a skirt that extends around the central axis to surround the central body with an inner edge adjacent to the central body and an opposing outer edge and is radially spaced from the central body by a plurality of tabs to form an open space allowing air passage, and a plurality of external cooperating engaging formations on said skirt, where the plurality of external cooperating engaging formation comprises at least one male engaging formation and at least one female engaging formation. These engageable formations may be protrusions for the male engaging formation which radially extend outward from said skirt, and female engaging formation defined by indents.

As the pouch cap comprises an air passage, the risk that a child will swallow and choke on the cap is prevented.

Among the many different possibilities contemplated, the male engaging formations can be slid into said female engaging formations to interlock the cap to other caps in a side-to-side manner. Further, it is contemplated that the external cooperating engaging may be formed in a sliding dovetail manner. It is still further contemplated that the cap might comprise a closed square protrusion protruding from the top plate of the central body. This square protrusion can be slid into the female engaging formation of a skirt of another cap. In the alternative, the cap may comprise a closed circular protrusion protruding from the top plate of the central body. The circular protrusion can be slid and rotated within the female engaging formation of a skirt of another cap, or can be perpendicularly rotatable with the female engaging formation of a skirt of another cap, or both.

Contemplated caps' central body may comprise a groove at the lower end making the cap rotatably engageable with the top end of a similar cap. The cap can also comprise at least one ridge protruding from the top end to ensure that a cap engaged with another cap vertically would not be easily detached. The ridge may be located around the perimeter of the upper part of the cap's central body, thereby allowing the cap to snap into another cap while still being able to rotate. In one embodiment, the ridge includes an undercut in the cap's molding. The ridge can take the form of an overhang, a collar or one or more teeth around the perimeter of the upper part of the cap's central body allowing the cap to snap into another cap while still being able to rotate the cap around the other cap.

Contemplated cap engaging formations can be tenons and mortises. These formations can either have the same size as that of the central body's top plate so that a side cap formation can engage with the top of a cap, or these formations can have a different diameter than that of the top plate.

In one embodiment the perimeter of the outer edge of a cap's skirt can be a hexagon, a triangle, a square circular, or any other polygonal shape. In certain embodiments, the female engaging formations and male engaging formations can be alternatively located along an entire height of the skirt.

Among the many possible shapes contemplated for caps, the outer edge of a cap's skirt can be a triangle with three sides where the side walls can be angled relative to the central axis making them look like pyramids. In a further embodiment, the circumference of the outer edge of the skirt may increase axially from the top end of the central body to the lower end making these caps suitable to form circular object such as a ball.

Various objects, features, aspects and advantages of the present embodiment will become more apparent from the following detailed description of the embodiment, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENT

Figure 1:
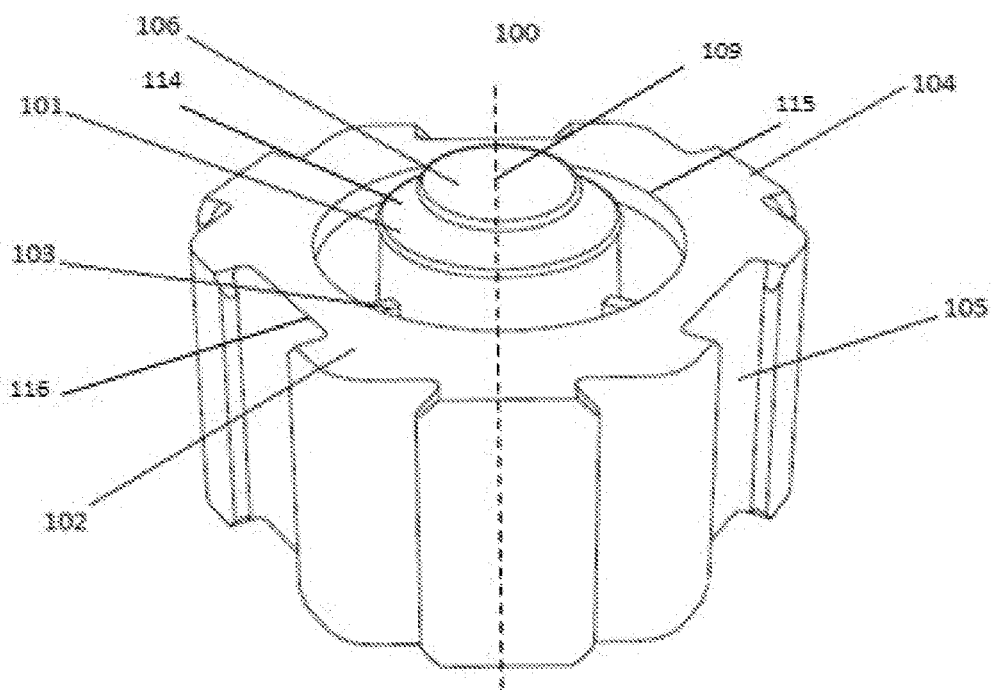
FIG. 1 is a perspective view of an embodiment of a pouch reusable cap.

The invention and its various embodiments can now be better understood by turning to the following detailed description of the preferred embodiments, which are presented as illustrated examples of the invention. It is expressly understood that the invention may be broader than the illustrated embodiments described below.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use must be understood as being generic to all possible meanings supported by the specification and by the word itself.

The definitions of the words or elements therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements or that a single element may be substituted for two or more elements. Although elements may be described above as acting in certain combinations, it is to be expressly understood that one or more elements from a certain combination can in some cases be excised from the combination and that the combination may be directed to a sub-combination or variation of a sub-combination.

Thus, specific embodiments and applications of reusable connectable caps are disclosed below. It should be apparent, however, to those skilled in the art that many more modifications besides those described herein are possible without departing from the inventive concepts herein. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the subject matter as viewed by a person with ordinary skill in the art, now known or later devised, are expressly contemplated as an equivalent. Therefore, obvious substitutions now or later known to one with ordinary skill in the art are defined to be within the scope of the defined elements. The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

The description will be made as to the embodiments of the present disclosure in conjunction with the accompanying FIGS. 1 through 16. In accordance with the purposes of this disclosure, as embodied broadly described herein, this disclosure in one aspect, relates to a reusable connectable cap.

Figure 2:
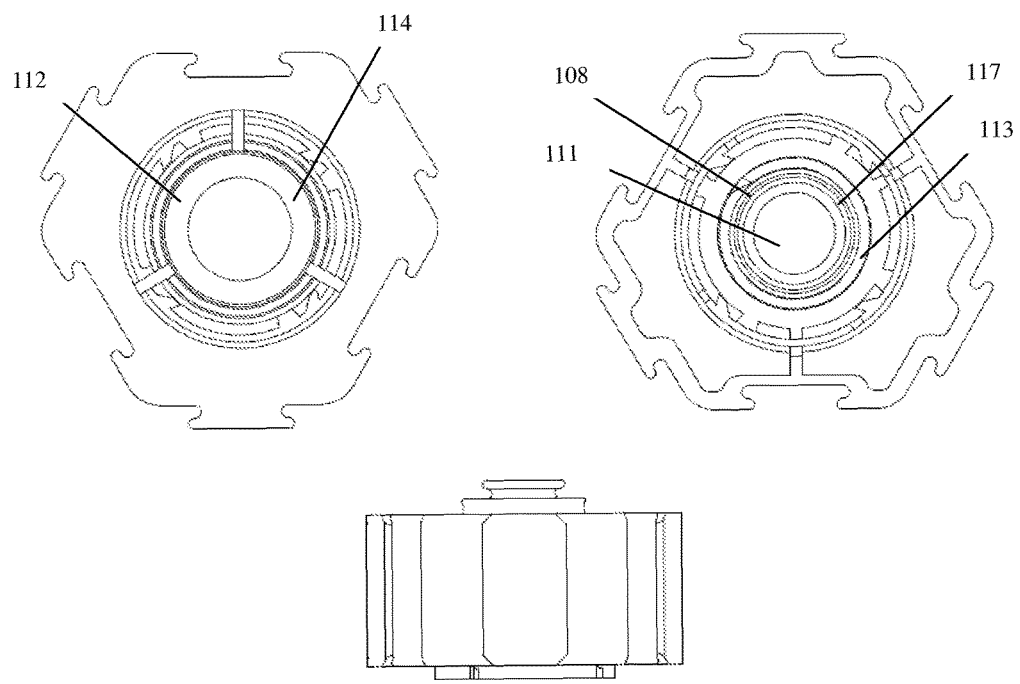
FIG. 2 is a top, bottom and side view of the cap of FIG. 1.
Figure 3:
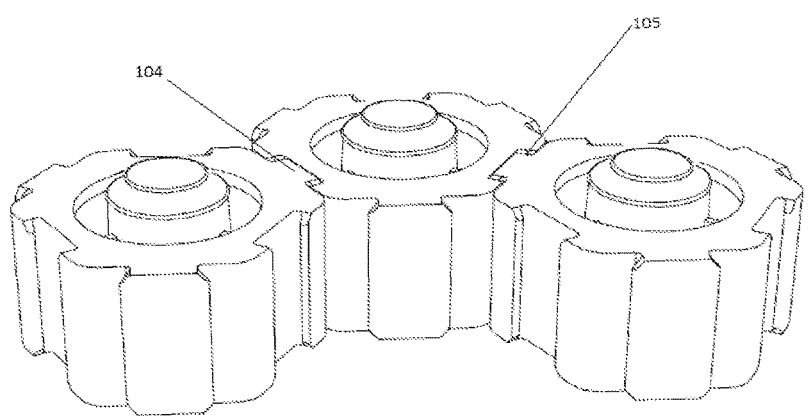
FIG. 3 is a perspective view of a group of caps of FIG. 1, laterally engaged to each other.

FIGS. 1 through 3 show a cap according to one embodiment of the disclosure. The reusable cap 100 has a central body 101 which extends along an imaginary central axis 109. The central body 101 may be cylindrical on the outside and is provided with a threading 108 on the inside for screwing to the neck of a pouch (not shown). The central body 101 generally comprises a lower end 113 that is open and a top end 114 that is closed by a top plate 112. The lower end is rotatably engageable with the top end of a similar cap.

The cap 100 further comprises a skirt 102 that generally extends around the central axis 109 to surround the central body 101. The skirt 102 comprises an inner edge adjacent to the central body and an opposing outer edge. The skirt 102 is radially spaced from the central body 101 by a plurality of tabs 103 to form an open space allowing air passage. The skirt is radially spaced from the central body thanks to the tabs 103 in such a way to form an open space for air passage. This air passage is created to prevent suffocation and choking accidents due to the accidental swallowing of the cap by young users. At least two tabs 103 may be angularly equidistant.

The cap's skirt 102 also comprises a plurality of external cooperating engaging formations 104 and 105. These engaging formations may be divided into male engaging formations 104 and female engaging formations 105 alternatively located along the skirt wall. Male engaging formations 104 are generally defined as a protrusion extending radially outward from the skirt. The female engaging formations 105 can be defined as an indent on the skirt. Preferably the skirt 102 comprises a plurality of sides which succeed in annular series around the central body, connecting to each other, preferably with rounded edges. In one embodiment, the sides are arched and concave towards the central body.

Figure 12:
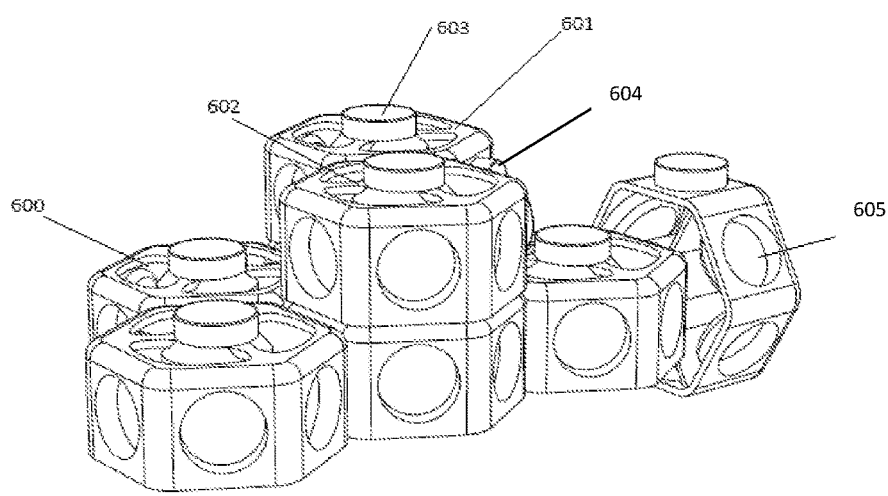
FIG. 12 is a perspective view of another embodiment of the caps with tenons and mortises engaged to one another.

In some embodiments, the female engaging formations 105 and male engaging formations 104 can be alternatively located along an entire height of the skirt. Alternative embodiments may comprise adjacent male engaging formations and adjacent female engaging formations. In a further embodiment, the central body may also act as the male engaging formation as shown in FIG. 12. Moreover, according to one embodiment variation, the engaging members are convergent or divergent to/from each other.

In certain embodiments, the cap is made in one piece in plastic material, for example by molding. The cap, according to the present disclosure, makes a pouch, bottle or container visually captivating, especially in the eyes of a child, in that the caps can be used as a toy by connecting them together in various ways.

FIG. 2 shows from left to right a top view, a bottom view and a side view of pouch cap 100 which may be made of plastic by injection molding and may take the shape of a polygon. In one embodiment the polygon takes the shape of a hexagon with six main sides and protrusions and indents within each side, thus forming a hexagonal object having six main sides and six main angles with each of the six sides at least one surface. In certain embodiments, the female engaging formations 105 are an indented C shape whereas the male formation are protrusions adapted to slide tightly within the female engaging formations. Each of the surfaces respectively, may have indents 105 or detents 104 which are of a size and shape to form a mating friction fit or sliding fit. The engaging formations can be staggered such that when multiple caps are connected to one another, no gaps are visible between the caps as seen in FIG. 3.

The pouch cap may also have threads 108 on its interior which mate with threads on a pouch neck or the like (not shown) and the top plate 109 of the pouch cap is formed by a circular protrusion which also mates with the interior circular shape 111 of the bottom of the pouch cap.

Two bodies according to the disclosure may also be assembled adjacent each other by engaging the formation member of a first body into the connection member of a second body, as shown in FIG. 3.

Two or more caps may fit together in a number of ways as shown in FIGS. 5, 6, 8 and 16 i.e., on top of each other, adjacent each other, perpendicularly adjacent to one another or at least two different angles to each other, giving an unlimited number of configurations possible.

Figure 4:
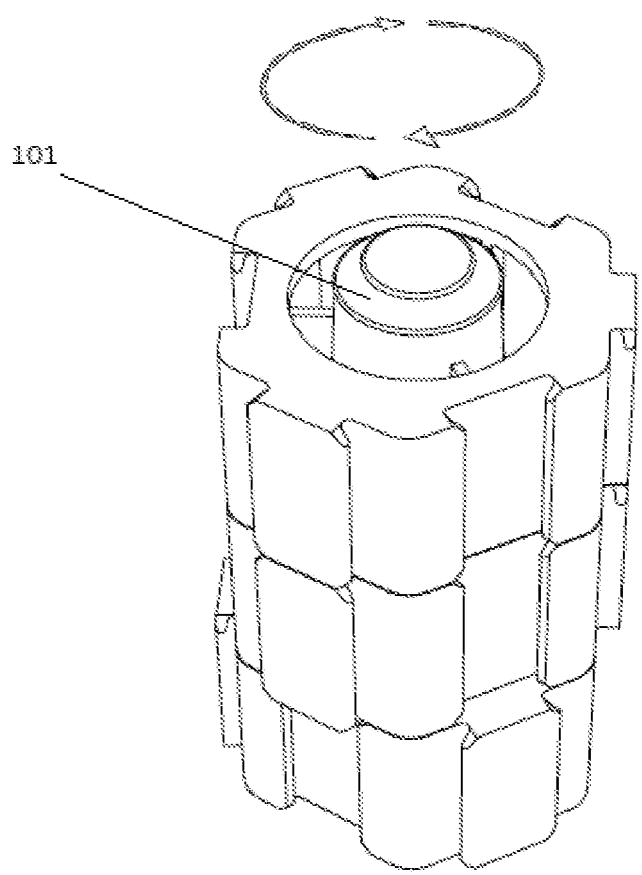
FIG. 4 is a perspective view of a group of caps of FIG. 1, vertically engaged to each other.

As shown in FIG. 4, the central body portion 101 is dimensioned in such a manner that it enables a rotational movement when it is fitted within the cavity of the base portion of another cap. The central body comprises a groove at the lower end suitable to rotatably engage with the top end of a similar cap. In particular, the central body portion 101 may comprise at least one protruding ridge 107 on the central body, such that when caps are stacked on top of each other, they cannot slide out easily or be detached with exercising some force. This gives the structure more stability. The central body may comprise a substantially cylindrical shape with an external diameter essentially equal to the internal diameter (not shown) of the cavity. Two bodies according to the invention may thus be stacked upon each other by fitting the central body of a first cap into the cavity in the base portion of the central body of a second cap. Moreover, the central body may comprise a guarantee seal 117 as shown in FIG. 2 suitable for breaking when the cap is unscrewed from the pouch, for example positioned at the lower end 113 of the central body 101 on the side opposite the top plate 112.

Figure 5:
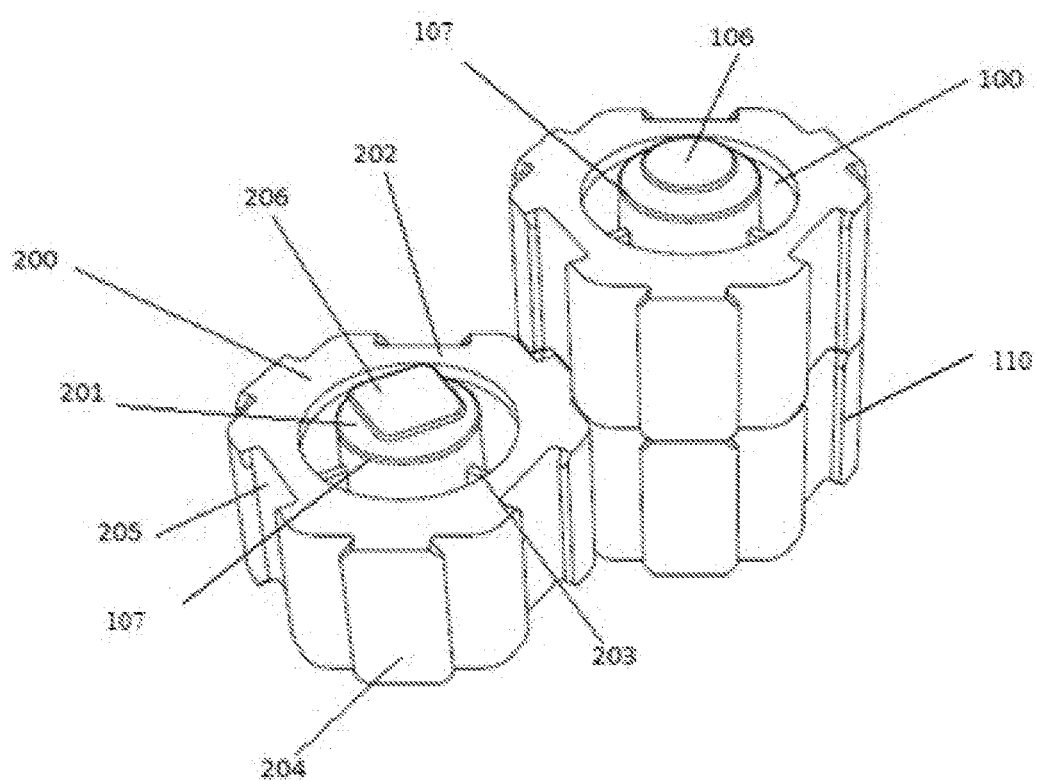
FIG. 5 is a perspective view of a group of two different cap embodiments, laterally and vertically engaged to each other.

FIG. 5 illustrates a further construction with a plurality of bodies according to the disclosure. It may for example be assembled as follows. A second body 100 is stacked on a first body 110 as explained hereinabove. Then, a third body 200 is assembled adjacent said first body as explained in connection with FIG. 3. As indicated by the arrow, both caps 100 and 110 may be rotated over an angle of at least 180 degrees, since the shape of the outer surface of the respective central body portions is substantially cylindrical. Thanks to the presence of at least one protruding ridge 107 on the central body, caps are stacked on top of each other without sliding out easily. This gives the structure more stability. Different embodiments may be connected to one another as depicted in FIG. 5 where one cap with a closed circular protrusion 106 is adjacent to a cap with a closed square protrusion 206.

Figure 6:
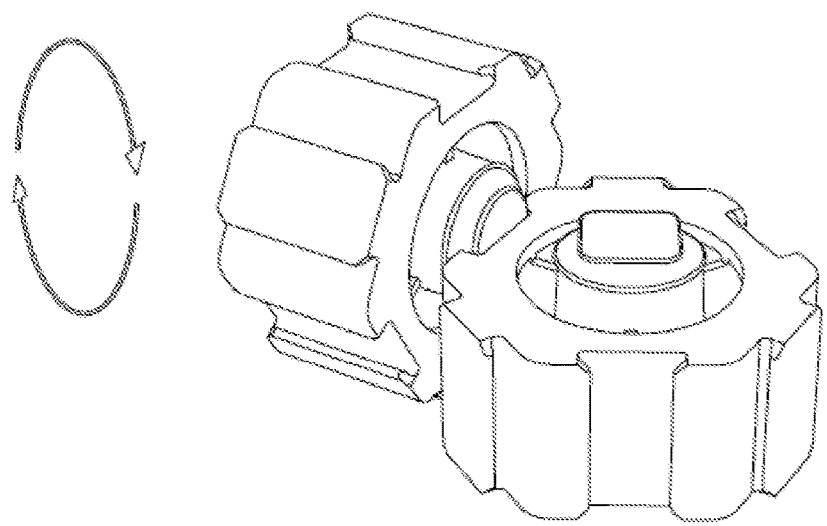
FIG. 6 is a perspective view showing one possible configuration of two different cap embodiments engaged to one another.

FIG. 6 shows another embodiment where the closed protrusion 106 protruding from the central body 101 central body portion is dimensioned in such a manner that it enables a rotation movement when it is fitted within the female engaging formation 105 of the skirt of another cap. In particular, the central body portion has a substantially cylindrical shape with an external diameter essentially equal to the internal diameter (not shown) of the female formation, allowing it to engage with another cap through sliding movement and can then be rotated.

Figure 8:
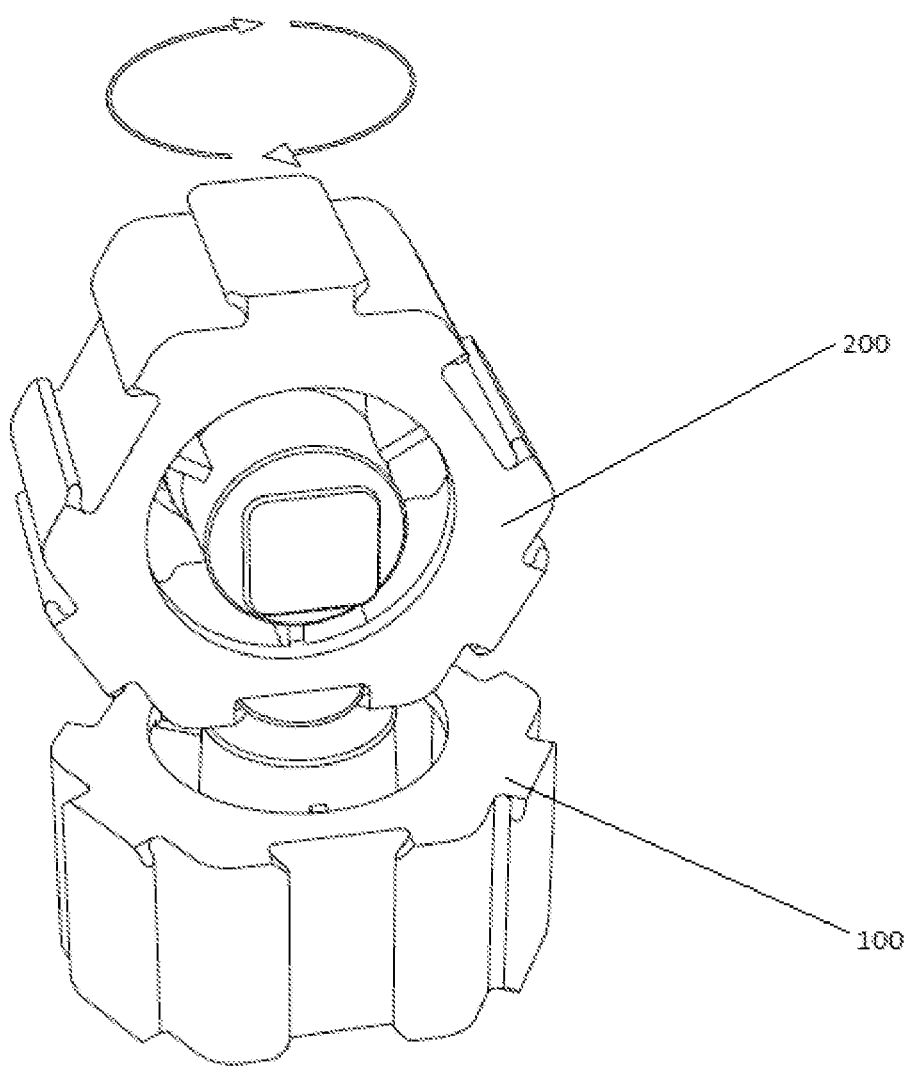
FIG. 8 is a perspective view showing an alternative configuration of different cap embodiments rotatably engaged to one another.

As shown in FIG. 8, a cap 200 with a closed square protrusion 206 can be attached perpendicularly to the closed circular protrusion of cap 100, and can then be rotated as indicated by the arrow over an angle of at least 180 degrees, since the C shape of the female engagement of this embodiment allows for the closed protrusion to be slid within the female engaging formation then rotated.

According to an alternative embodiment (not shown), the connection member could be formed by only a male engaging member which is provided to be fitted in a corresponding female member of another body. The connection member may be formed by protrusions extending outwardly from the skirt, but could also form an excavation in one body provided to fit within a protrusion of another body. In a further embodiment, the connection member could be formed by only female engaging members which are provided to be fitted with a corresponding male member of another body, or to be fitted with a corresponding central body member of another cap.

Figure 9:
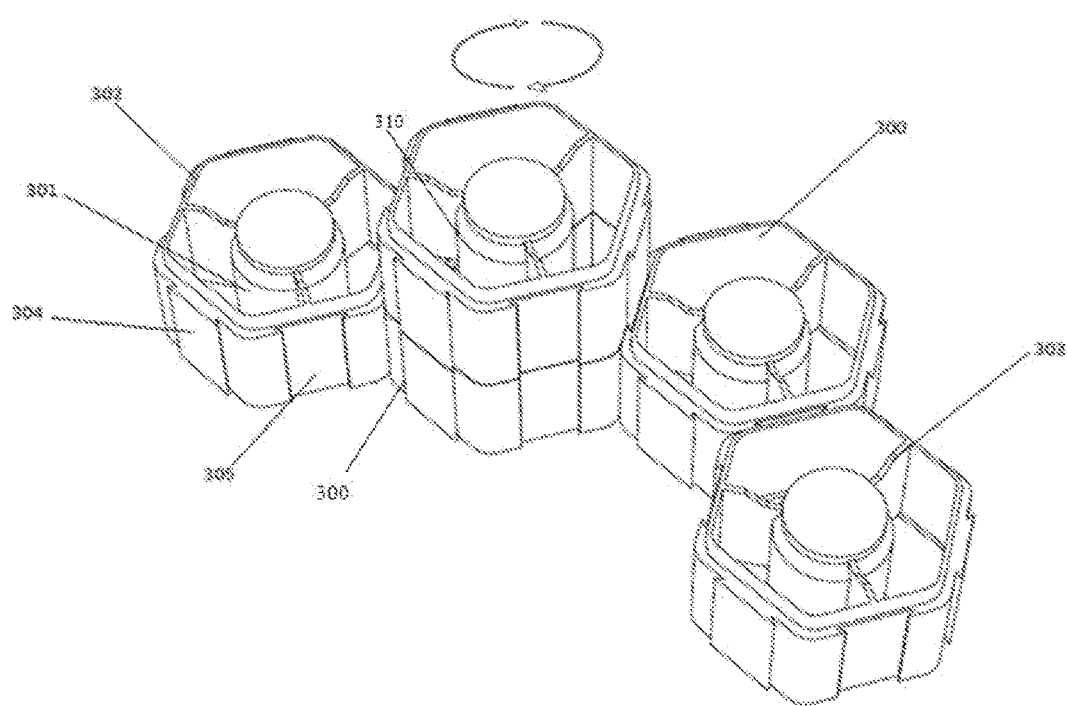
FIG. 9 is a perspective view of another embodiment of the caps engaged to one another.

FIG. 9 illustrates a further construction with a plurality of caps according to another embodiment of the disclosure. It may for example be assembled as follows. A second body 310 is stacked on a first body 300 as explained hereinabove. Then, a third and fourth body are assembled adjacent said first body. A fifth body is then assembled adjacent to a third body. Optionally, additional bodies may be assembled adjacent of the second, third, fourth or fifth cap by engaging the male 304 and female 305 members of those caps to fit into the female and male members of the other bodies. Optionally, additional bodies may be assembled stacked on top of the second, third, fourth or fifth cap by engaging the central body members 301 of those caps to fit into the cavity of the bottom of central bodies of the connecting caps. As indicated by the arrow, caps stacked on one another such as 310 may be rotated over an angle of at least 180 degrees, since the shape of the outer surface of the respective base portions is substantially cylindrical.

Figure 10:
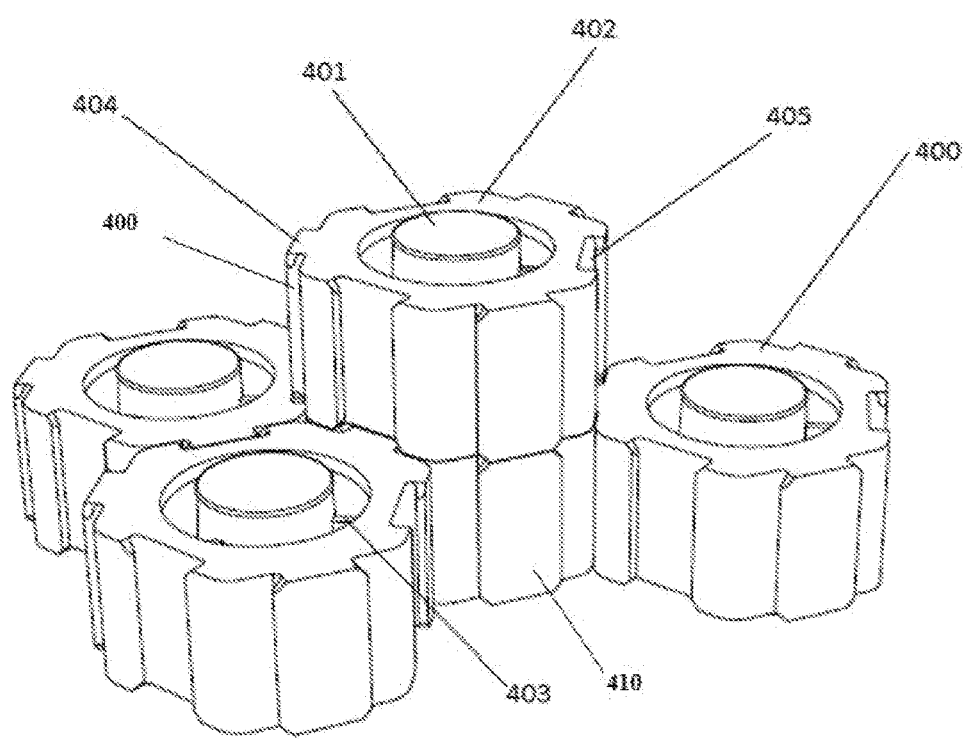
FIG. 10 is a perspective view of an alternative embodiment of the caps engaged to one another.

FIG. 10 illustrates another construction with a plurality of caps according to another embodiment of the disclosure. It may for example be assembled as follows. A second cap according to another embodiment 400 is stacked on a first body 410 as explained hereinabove. Then, a third, fourth and fifth cap are assembled adjacent said first cap. Optionally, additional bodies may be assembled adjacent or on top of the second, third, fourth or fifth cap by engaging the male 404 and female 405 members of those caps to fit into the female and male members of the other bodies. The bodies may be stacked on top of one another by engaging the central body members 401 of those caps to fit into the cavity of the bottom of central bodies of the connecting caps. As indicated by the arrow, caps stacked on one another such as 400 may be rotated over an angle of at least 180 degrees, since the shape of the outer surface of the respective base portions is substantially cylindrical.

For embodiment 400, the skirt portion has a substantially polygonal surface; in particular the inner wall of the skirt is substantially cylindrical whereas the outer wall surface is polygonal. In this particular embodiment, the outer wall of the skirt is hexagonal. The particular cylindrical shape is illustrated in FIG. 10, but the same reasoning could be applied if the shape is different such as for example the shape illustrated in FIG. 11 or FIG. 16. In FIG. 10, the outer surfaces of the skirt or male and female engaging members are respectively 404 and 405 can slide into one another so as to provide a tighter structure when the caps are assembled adjacent each other.

According to this embodiment 400, the male members 404 form protrusions extending outwardly from the outer wall of the skirt 402. In addition, the male and female members are shaped in such a manner that they are to be mated to each other by sliding the male member within the female member according to a direction essentially parallel to the central axis of the central body 401. An advantage of this preferred embodiment is that two bodies, when assembled adjacent each other by mating the connection members to each other, are tightly connected to each other and a relatively high force will be required for pulling the two caps apart from each other.

The shapes of the male and female members also determine the degree of tightness of the construction. It has been found that female members 405 which are substantially C-shaped and male members 404 having a corresponding complementary shape, as illustrated in FIG. 10, contribute advantageously to the degree of tightness of the construction.

FIGS. 12 to 15 show other embodiments of male and female members, wherein the female members 605, 705, 805 and 905. Assembling two bodies according to these embodiments occurs by pressing them together instead of sliding them one into another. For this purpose, at least the female members should have an opening with a diameter which is substantially the same as that of the male engaging members. In certain embodiments where the diameter of the central body is substantially the same as that of female members, the top end of the central body may act as a male engaging member, and a user may connect the caps by pressing the top of the central body perpendicularly into the female engaging formation.

Figure 13:
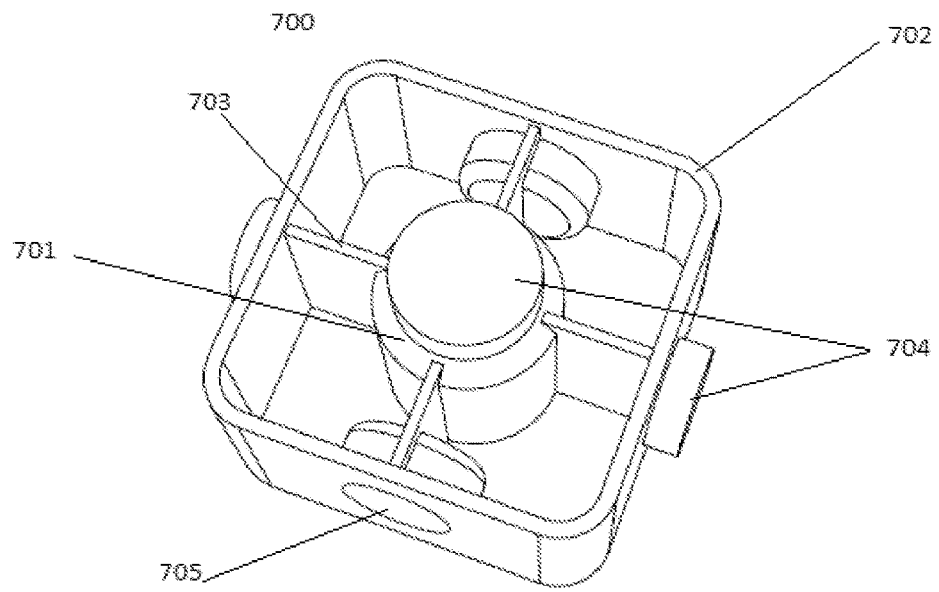
FIG. 13 is a perspective view of a different embodiment of the cap.
Figure 14:
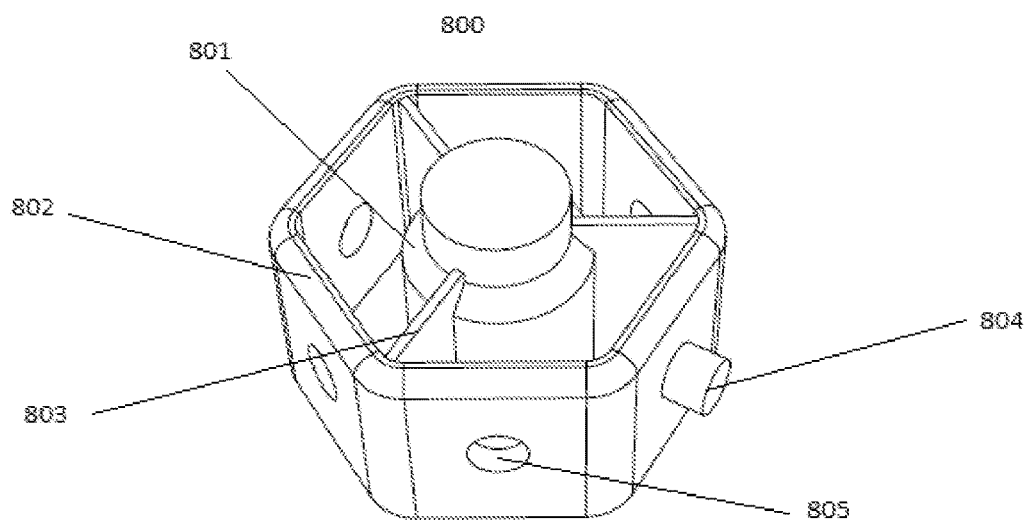
FIG. 14 is a perspective view of a further embodiment of the cap.
Figure 15:
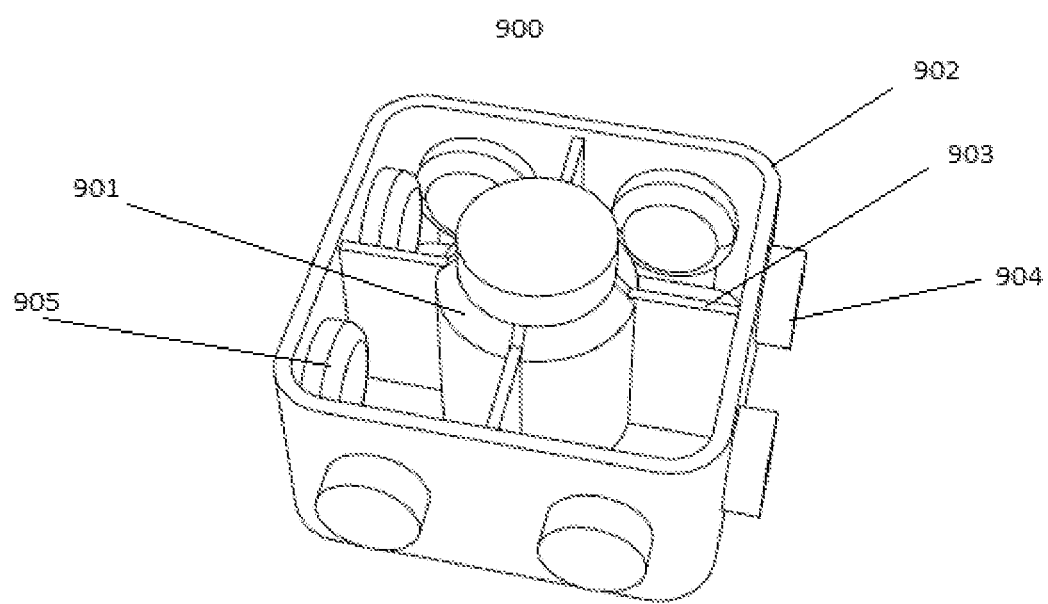
FIG. 15 is a perspective view of an alternative embodiment of the cap.

Optionally as illustrated in FIGS. 13 and 15 show female engaging members provided with a stopping member provided for limiting sliding of two assembled bodies with respect to each other. The male member could have the same length as the female members without the stopping member as illustrated in FIGS. 12 and 14.

Figure 11:
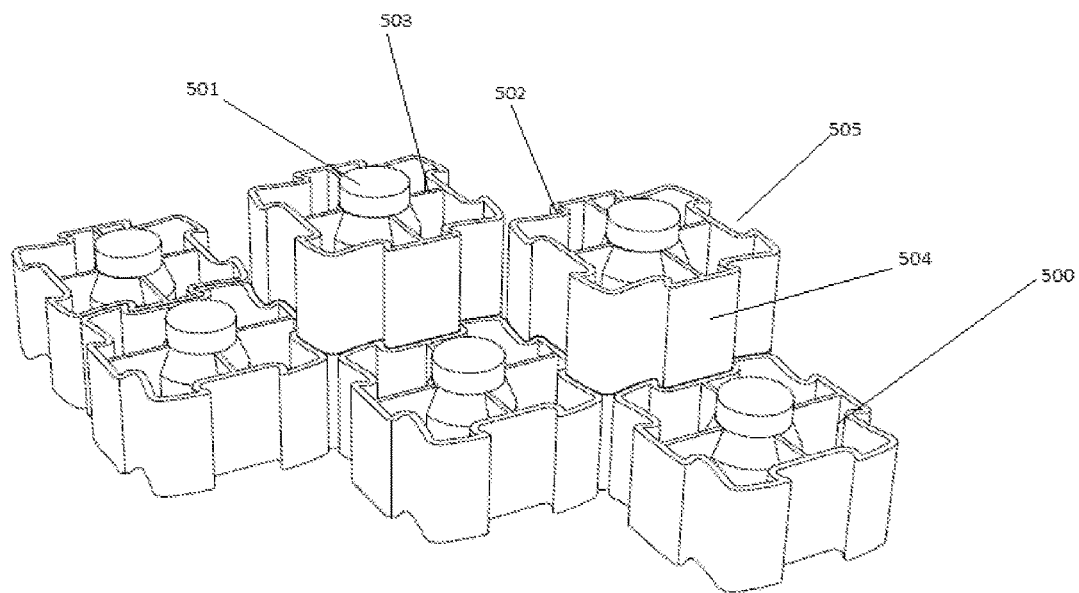
FIG. 11 is a perspective view of a further embodiment of the caps engaged to one another.
Figure 16:
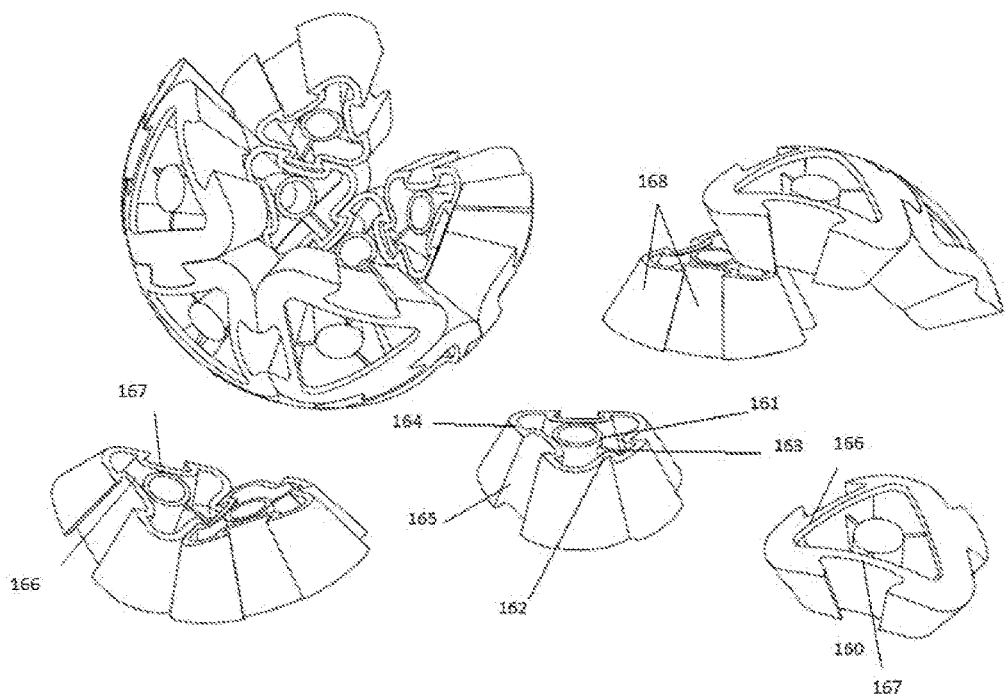
FIG. 16 is a perspective view of a further embodiment of the caps engaged to one another.

Various embodiments of the cap will have various shapes. In some embodiments, the perimeter of the outer edge of the skirt may be a triangle as shown in FIG. 16, a square as shown in FIGS. 11, 13, and 16. Alternatively, the perimeter of the outer edge of the skirt can be a hexagon as shown in embodiments 100, 200, 300, 400, 600, 800, or any other polygonal shape not shown in the appended figures.

In a particular embodiment as shown in FIG. 16, the perimeter of the outer edge 167 of the skirt 162 can have side walls 168 which are angled relative to the central body 161. In some embodiments, the circumference of the outer edge of the skirt may increase axially from the top end of the central body to the lower end or from the lower end to the top end. The width of the skirt may also increase axially. This embodiment can be used for rounder figurines and images such as making a ball, a sphere, or any semi spherical object.

Embodiment 100 shows a closed protrusion 106 extending from the top of the central body 101. The closed protrusion may be circular as seen in embodiment 100, square as depicted in embodiment 200, or any other polygonal shape. The closed protrusion 106 is engageable with the female engaging formations 105. The closed circular protrusion 106 can be slid into and engaged to the female formation 105. The protrusion 106 may also comprise at least one ridge projecting outwardly which ensures that the closed protrusion engagement does not easily detach from the sides of another cap. In addition, after being slid into to the skirt of another cap, the cap can be rotated while attached to the skirt of another cap as shown in FIGS. 6 and 8.

Embodiment 200 shows a square closed protrusion 206 extending from the top of the central body 201. The square closed protrusion 206 is engageable with the female engaging formations 205 or the female engaging formations of other embodiments with an opening of substantially similar dimension as the side of the closed protrusion 206. The closed square protrusion 206 can be slid and engaged to the female formation. The protrusion 206 may also comprise at least one ridge projecting outwardly which ensures that the closed protrusion engagement does not easily detach from the sides of another cap.

According to embodiments shown in FIGS. 1 through 11, the male engageable formations can be slid into the female engaging formations to interlock the cap to other caps in a side-to-side manner. In some embodiments, the external cooperating formations may be formed in a sliding dovetail manner so that when the caps are interlocked to one another, they do not easily detach and come apart. In alternative embodiments, the central body may comprise a groove at the lower end which is suitable to engage and rotate with the top end of a similar cap. In addition, certain embodiments may also comprise one or more ridge protruding from the top end of the central body. This is particularly desirable when constructing figurines, puzzles or images with the caps, and helps add stability to the structure.

Figure 7:
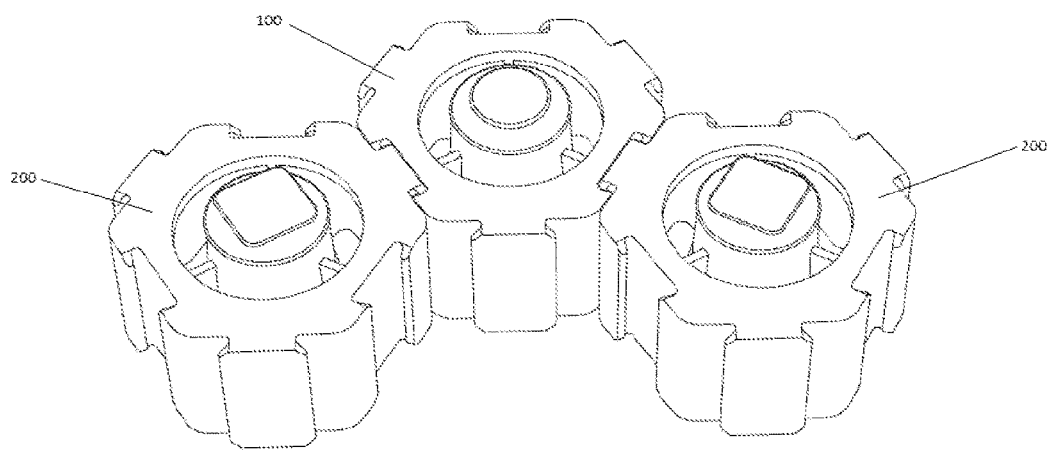
FIG. 7 is a perspective view showing another possible configuration of different cap embodiments engaged to one another.

In some embodiments such as caps 100, 200 and 400, the skirt has a substantial thickness. When these cap embodiments are engaged to one another, they form a sturdy sheet of caps with no visible gaps in between as shown in FIGS. 3, 7, and 10. Other embodiments such as 300, 500, 700, 800 or 900, the skirt may have a smaller thickness so as to appear as a thin wall making the cap look more open.

FIGS. 12 through 15 depict various embodiments of the cap with tenons 604 and mortises 605 engaging formations. In the embodiment as shown in FIG. 12, where the central body 603 has the same diameter as the tenon 604, the central body may act as a tenon 604, or a male engaging formation. Female engaging formations or mortises 605 may be located throughout the wall of the skirt. The central body 603 may serve as a tenon, and tenons may also be located along the wall of the skirt. In other embodiments such as the one shown in FIG. 14, the central body 801 has a different dimension than the tenons and mortises along the skirt 802. In this particular embodiment, the central body may not be engageable with the engaging formation on the skirt 601; however, the engaging formations on the skirt can be engaged with one another. These tenons and mortises can be engaged to one another in a press, snap or clipping manner.

Many alterations and modifications may be made by those having ordinary skill in the art without departing from the spirit and scope of the invention. Therefore, it must be understood that the illustrated embodiments have been set forth only for the purposes of example and that they should not be taken as limiting the invention. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of pouch caps have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements or components in a non-exclusive manner, indicating that the referenced elements or components, may be present, or utilized, or combined with other elements or components, that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment.

What is claimed is:

1. A reusable cap for a container comprising:
   a central body extending along a central axis with a lower end that is open and a top end that is closed by a top plate, wherein the lower end is rotatably engageable with the top end of a similar cap;
   a skirt that extends around the central axis to surround the central body with an inner edge adjacent to the central body and an opposing outer edge and is radially spaced from the central body by a plurality of tabs to form an open space allowing air passage;
   a plurality of external cooperating engaging formations on said skirt, wherein the plurality of external cooperating engaging formations comprise at least one male engaging formation and at least one female engaging formation; and
   wherein the male engaging formation is a protrusion extending radially outward from said skirt and the female engaging formation is defined by an indent;
   a protrusion extending outwardly from said top plate of said central body slidably receivable with said female engaging formation of a skirt of another cap.

2. The cap as recited in claim 1, wherein said male engaging formations are slidably receivable within said female engaging formations to interlock the cap to other caps in a side-to-side manner.

3. The cap as recited in claim 1, wherein the external cooperating engaging formations are formed in a sliding dovetail manner.

4. The cap as recited in claim 1, wherein the central body comprises a groove at the lower end suitable to rotatably engage with the top end of a similar cap.

5. The cap as recited in claim 4, wherein the central body comprises at least one ridge protruding from the top end.

6. The cap as recited in claim 5, wherein the central body of a cap can be snapped onto the central body of another cap.

7. The cap as recited in claim 1, wherein the engaging formations are tenons and mortises.

8. The cap as recited in claim 7, wherein the diameter of the engaging formations is substantially the same as the diameter of the central body's top plate.

9. The cap as recited in claim 7, wherein the diameter of the engaging formations is different than the diameter of the central body's top plate.

10. The cap as recited in claim 1, wherein the perimeter of the outer edge of said skirt is a polygon.

11. The cap as recited in claim 10, wherein the female engaging formations and male engaging formations are alternatively located along an entire height of the skirt.

12. The cap as recited in claim 1, wherein the perimeter of the outer edge of said skirt is a triangle comprising three side walls.

13. The cap as recited in claim 12, wherein the side walls are angled relative to the central axis and wherein the circumference of the outer edge of the skirt increases axially from the top end of the central body to the lower end.

14. A reusable cap for a container comprising:
a central body extending along a central axis with a lower end that is open and a top end that is closed by a top plate, wherein the lower end is rotatably engageable with the top end of a similar cap;
a skirt that extends around the central axis to surround the central body with an inner edge adjacent to the central body and an opposing outer edge and is radially spaced from the central body by a plurality of tabs to form an open space allowing air passage;
a plurality of external cooperating engaging formations on said skirt, wherein the plurality of external cooperating engaging formations comprise at least one male engaging formation and at least one female engaging formation; and
wherein the male engaging formation is a protrusion extending radially outward from said skirt and the female engaging formation is defined by an indent;
a protrusion extending outwardly from said top plate of said central body slidably receivable with said female engaging formation of a skirt of another cap.

15. The cap as recited in claim 14, wherein the protrusion is a closed square protrusion protruding from the top plate of the central body.

16. The cap as recited in claim 14, wherein said protrusion is a closed circular protrusion protruding from the top plate of the central body.

17. The cap as recited in claim 16, wherein the circular protrusion is slidably receivable and perpendicularly rotatable with the female engaging formation of a skirt of another cap.

18. A method of connecting a plurality of container caps comprising the steps of:
providing a connectable cap comprising a plurality of male and female engaging formations and a central body;
sliding said male engaging formation into the female engaging formation of another cap;
snapping said central body of one connectable cap onto the central body another cap.

19. The method as recited in claim 18 further including rotating snapped connectable caps.

20. The method as recited in claim 18, wherein said sliding step further includes rotating said male engaging formation within said female engaging formation.

* * * * *